(12) United States Patent
Deltour et al.

(10) Patent No.: US 10,676,218 B2
(45) Date of Patent: Jun. 9, 2020

(54) SPACECRAFT

(71) Applicant: AIRBUS DEFENCE AND SPACE SAS, Les Mureaux (FR)

(72) Inventors: Bernard Deltour, Toulouse (FR); Sylvain Leconte, Toulouse (FR); Christophe Berend, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 16/303,776

(22) PCT Filed: May 23, 2017

(86) PCT No.: PCT/FR2017/051280
§ 371 (c)(1),
(2) Date: Nov. 21, 2018

(87) PCT Pub. No.: WO2017/203165
PCT Pub. Date: Nov. 30, 2017

(65) Prior Publication Data
US 2019/0337645 A1 Nov. 7, 2019

(30) Foreign Application Priority Data

May 23, 2016 (FR) ..................................... 16 54593
Dec. 16, 2016 (FR) ..................................... 16 62687

(51) Int. Cl.
*B64G 1/50* (2006.01)
*B64G 1/22* (2006.01)
*B64G 1/10* (2006.01)

(52) U.S. Cl.
CPC ............. *B64G 1/503* (2013.01); *B64G 1/222* (2013.01); *B64G 1/1007* (2013.01)

(58) Field of Classification Search
CPC ...... B64G 1/503; B64G 1/222; B64G 1/1007; B64G 1/58
See application file for complete search history.

(56) References Cited

U.S. PATENT DOCUMENTS 3,307,783 A    3/1967  Wiebelt
4,373,690 A *  2/1983  Stillman ................ B64G 1/222
                                                     136/245

(Continued)

FOREIGN PATENT DOCUMENTS

FR    2 823 182 A1    10/2002
WO    01/81173 A1     11/2001

OTHER PUBLICATIONS

Olson, Flexible Solar-Array Mechanism, 1973, NTRS NASA, pp. 233-242 and 244-249 (Year: 1973).*

(Continued)

*Primary Examiner* — Timothy D Collins
*Assistant Examiner* — Terri L Filosi
(74) *Attorney, Agent, or Firm* — Young & Thompson

(57) ABSTRACT

Disclosed is a spacecraft including a casing having a face, a radiator borne by the face, and a thermal insulation device borne by the radiator. The thermal insulation device includes: —a first screen device able to cover a first zone of the radiator, the first screen device including a thermally insulating and flexible sheet, and at least two springs capable of producing a constant reaction force, the springs being preformed in such a way as to wind up on themselves at rest and being fixed to the insulating sheet, the springs each having an end fixed to the radiator and a free end; and—a traction device able to pull on the free end of the springs to make the sheet cover the first zone and to release the free end in order to expose the first zone to space.

18 Claims, 12 Drawing Sheets

(56) References Cited

U.S. PATENT DOCUMENTS

| | | | |
|---|---|---|---|
| 6,423,568 B1* | 7/2002 | Verlinden | H01L 31/022441 |
| | | | 136/244 |
| 6,669,147 B2 | 12/2003 | Bertheux et al. | |
| 8,683,755 B1* | 4/2014 | Spence | B64G 1/222 |
| | | | 136/245 |
| 2002/0056790 A1 | 5/2002 | Trimmer | |
| 2014/0151485 A1* | 6/2014 | Baudasse | B64G 1/222 |
| | | | 242/375 |
| 2016/0297552 A1* | 10/2016 | Moser | B64G 1/222 |

OTHER PUBLICATIONS

Hwangbo, "Motorized Thermal Control Shade", Environmental and Thermal Control Systems for Space Vehicles—Les Systemes De Regulation Thermique Et D'Environment Desvehicules Spatiaux. International Symposium, 1983, pp. 345-349.

International Search Report, dated Sep. 21, 2017, from corresponding PCT application No. PCT/FR2017/051280.

* cited by examiner

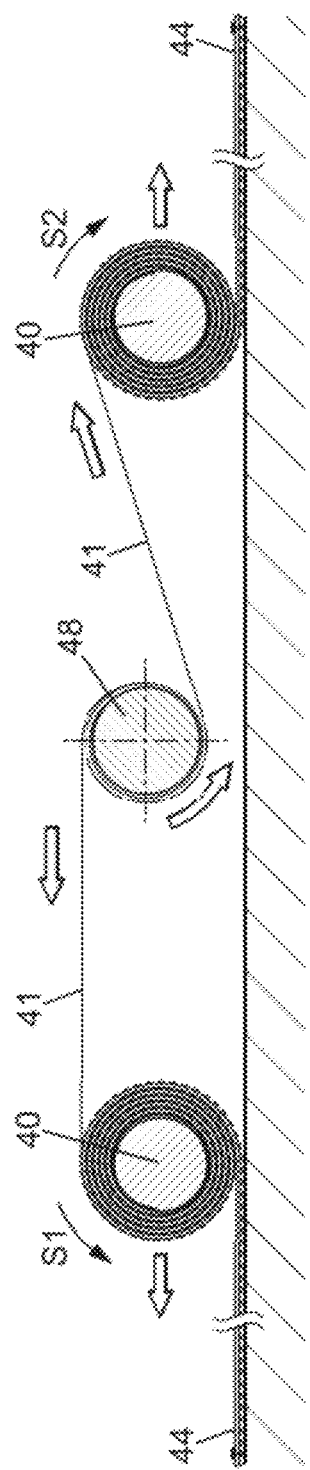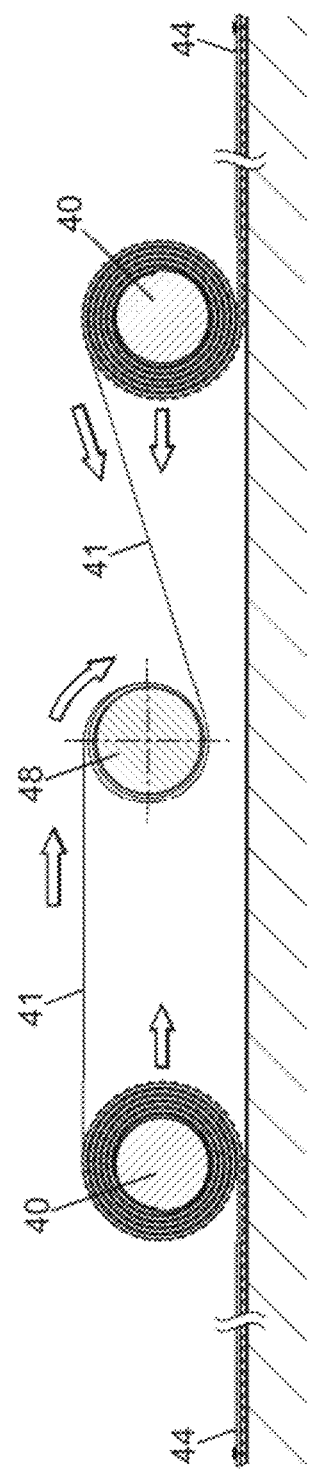

SPACECRAFT

BACKGROUND OF THE INVENTION

Field of the Invention

The present invention lies within the field of spacecraft. In particular, the present invention relates to the field of heat control in communications satellites.

Description of the Related Art

Heat dissipation from the payload of communications satellites is achieved by radiators mounted on the north and south walls. These radiators are sized to enable removal of the heat generated by the payload under extreme operating conditions, typically when the payload is operating at full rating, the reflecting surface of the radiators is degraded, and assuming this is during a solstice period and therefore one of the heaters is heated by incident solar radiation.

In the opposite extreme operating conditions, for example when transferring the satellite from its injection orbit to its geostationary orbit, the payload will undergo very cold temperatures. It will then be heated, for example by heaters, to keep it above its minimum operating temperature. The electric power required for this heating can represent up to 30% of the electric power generated by the solar generators. It would be desirable to use this electric power for other purposes, for example to increase the propulsive force of the satellite during the transfer phase and thus shorten the duration of the transfer. This is even more critical when using electric propulsion (alone or in alternation with chemical propulsion), as the transfer time lasts several months.

Patent FR 2,823,182 proposes equipping satellites with deployable radiators having a radiant side and an insulating side. During the satellite's transfer phase to geostationary orbit, the deployable radiators are folded in so that their insulating face is facing towards the space environment. Once in geostationary orbit, the deployable radiators are deployed so that their radiant side is facing towards the space environment.

However, these deployable radiators are expensive, bulky, and complex to install, in particular because of the difficulty of implementing and mounting the systems for transferring heat from the radiators to the deployable radiators.

Furthermore, in the deployed position, the deployable radiators project laterally or vertically from the body of the satellite such that deploying them and folding them cannot be controlled in a manner dissociated from the position or movement of other satellite appendages. The deployed position of the deployable radiator is therefore not compatible with all positions of the solar panels, with all positions of the antennas, or with the use of certain thrusters.

Document WO 01/81173 discloses micro-louvers comprising a reflective material adapted to be rolled or unrolled when a force that is electrostatic, magnetic, piezoelectric, or produced by shape memory is applied to this material.

Document U.S. Pat. No. 3,307,783 discloses a thermostatic surface for spacecraft, consisting of bimetallic bands able to curve according to the temperature.

The document Hwangbo H "Motorized thermal control shade", environmental and thermal control systems for space vehicles XP000884251, describes a thermal insulation device comprising an insulating flexible sheet movable between an unfolded position in which the flexible sheet covers an area of the radiator and a folded position on itself in which the radiator area is exposed to the space.

SUMMARY OF THE INVENTION

The present invention aims to provide a spacecraft having a thermal insulation device that is compact, lightweight, and can be implemented independently of the positions of the other appendages.

To this end, the invention relates to a spacecraft comprising a body having at least one face, at least one radiator carried by said face, and at least one thermal insulation device carried by the radiator, characterized in that said thermal insulation device comprises:

a first screen device capable of covering a first area of said radiator, said first screen device comprising a thermally insulating and flexible sheet and at least two springs able to generate a constant reaction force, said springs being preformed so as to roll onto themselves at rest, said springs being fixed to the insulating sheet, said springs each having a first end fixed to a traction device and a second end fixed to the radiator; and a traction device able to pull in a pulling direction on the first end of said springs of the first screen device so that the insulating sheet covers the first area in a mode referred to as deployed mode, said traction device being able to release the first end of said springs in order to expose the first area to the space environment in a mode referred to as exposure mode.

According to some particular embodiments, the spacecraft comprises one or more of the following features:

the first screen device comprises at least two cables, each cable being integrally secured to said traction device and to the first end of the springs, said cables being interposed between two windings of the springs in exposure mode;

the first screen device further comprises a support rod extending in a direction perpendicular to the pulling direction and at least two first stops fixed to the radiator between the insulating sheet and the traction device, said first stops being able to wedge the support rod in place during launch of the spacecraft;

the traction device comprises:

a traction shaft mounted so as to rotate about an axis of rotation, said traction shaft extending perpendicularly to the pulling direction, the first end of said springs being integrally secured to said traction shaft; and a device for locking the rotation of the traction shaft about said axis of rotation;

the traction device comprises an actuator able to rotate the traction shaft;

the traction device further comprises a damping device able to damp the rotation of the traction shaft when the locking device is unlocked;

the thermal insulation device further comprises a second screen device able to cover a second area, said second screen device being identical to the first screen device, the springs of said second screen device extending parallel to the pulling direction;

the first screen device and the second screen device are arranged on the same side of the traction device, and in exposure mode the springs of the first screen device and the springs of the second screen device are rolled onto themselves in a same rolling direction.

the insulating sheet of the second screen device is arranged in the extension of the insulating sheet of the first screen device, along the pulling direction;

the insulating sheet of the second screen device is arranged in the extension of the insulating sheet of the first screen device, along a direction perpendicular to the pulling direction;

the traction device is arranged between the first screen device and the second screen device, and in exposure mode the springs of the first screen device are rolled onto themselves in a first rolling direction and the springs of the second screen device are rolled onto themselves in a second rolling direction, the second rolling direction being opposite to the first rolling direction;

the insulating sheet of the first screen device has a length greater than the length of the insulating sheet of the second screen device, said length being measured in the pulling direction, and the traction shaft supports at least two pulleys having a diameter greater the diameter of the traction shaft, said cables of the second screen device being wound on said pulleys.

the insulating sheet of the first screen device has a width greater than the width of the second screen device, said width being measured in a direction perpendicular to the pulling direction;

the first screen device comprises at least two ramps fixed to the radiator in a direction parallel to the pulling direction, at least one among the springs and the ends of the support rods being able to bear against said ramps in deployed mode, said ramps having ramp portions which protrude relative to the radiator;

at least one edge of the insulating sheet has at least one cutout;

The spacecraft comprises a first gear mechanism fixed to the free end of a traction shaft, a bevel gear device coupled to the first gear mechanism, an additional traction shaft having a second gear mechanism coupled to the bevel gear device, and at least one additional screen device fixed by cables to the additional traction shaft, the additional traction shaft extending along the pulling direction;

said springs are flat strips of stainless steel in the form of a ribbon, said strips having a width between 5 and 30 millimeters;

the insulating sheet is a sheet of KAPTON™ (polyimide film) covered with an aluminum layer.

BRIEF DESCRIPTION OF THE DRAWINGS

The invention will be better understood from reading the following description, given only as an example and with reference to the figures in which:

FIG. 10 is a section diagram of the thermal insulation device shown in FIG. 9, illustrating the operating principle of the thermal insulation device during exposure mode;

FIG. 11 is a section diagram of the thermal insulation device shown in FIG. 9, illustrating the operating principle of the thermal insulation device during deployment mode;

DESCRIPTION OF THE PREFERRED EMBODIMENTS

Figure 1:
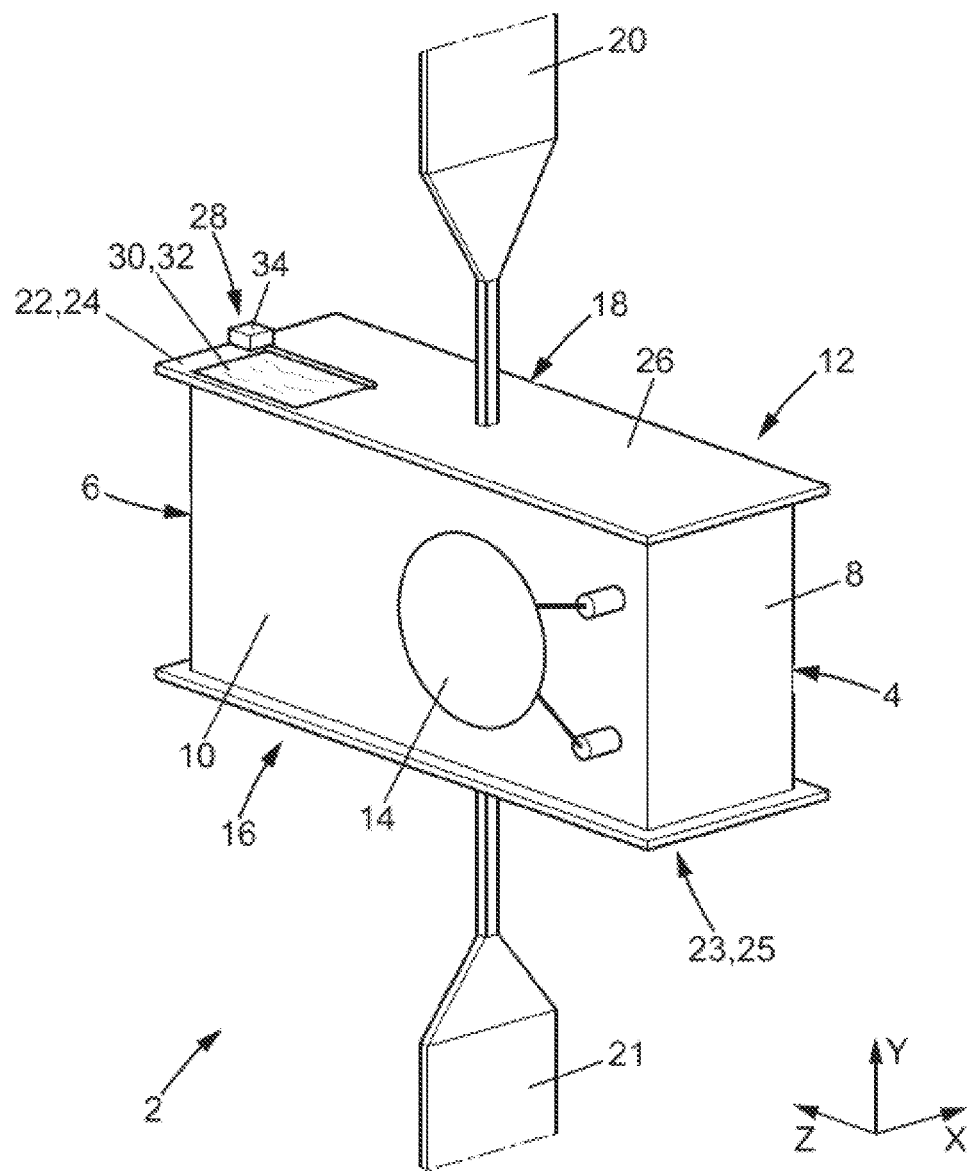
FIG. 1 is a schematic perspective view of a spacecraft according to the present invention.

Referring to FIG. 1, a spacecraft 2 according to the invention is in the form of a parallelepiped body 4. This body 4 always has the same face turned towards the Earth, said face being called the Earth face 6. The opposite side parallel to the Earth face 6 is in turn referred to as the anti-Earth or zenith face 8.

Face −X, also called the east face 10, and face +X, also called the west face 12, are opposite sides that are parallel to each other and perpendicular to the equatorial plane once the satellite is in position in its geostationary orbit. Communication antennas 14 are generally fixed to faces −X 10 and +X 12. Face −Y, also known as the south face 16, and face +Y, also known as the north face 18, are two other faces of the body. They are opposite and parallel to one another and perpendicular to the north-south axis of the Earth.

The spacecraft 2 generally comprises a solar panel 20 and a radiator 22 which are fixed on face +Y 18, and a solar panel 21 and a main radiator 23 which are fixed on face −Y 16.

The radiators 22, 23 are used for cooling the electronic devices contained in the body. These electronic devices, not shown in the figures, are thermally connected to the radiators, for example by means of heat pipes which are also not shown.

Each radiator 22, 23, of generally parallelepiped shape, has an internal main face fixed on the body and an external main face 24, 25 opposite to the internal main face and on the side facing the space environment external to the spacecraft. With reference to the orthonormal coordinate system illustrated in FIG. 1, the radiators 22, 23 extend in a plane (X, Z). They have longitudinal edges 26.

Figure 2:
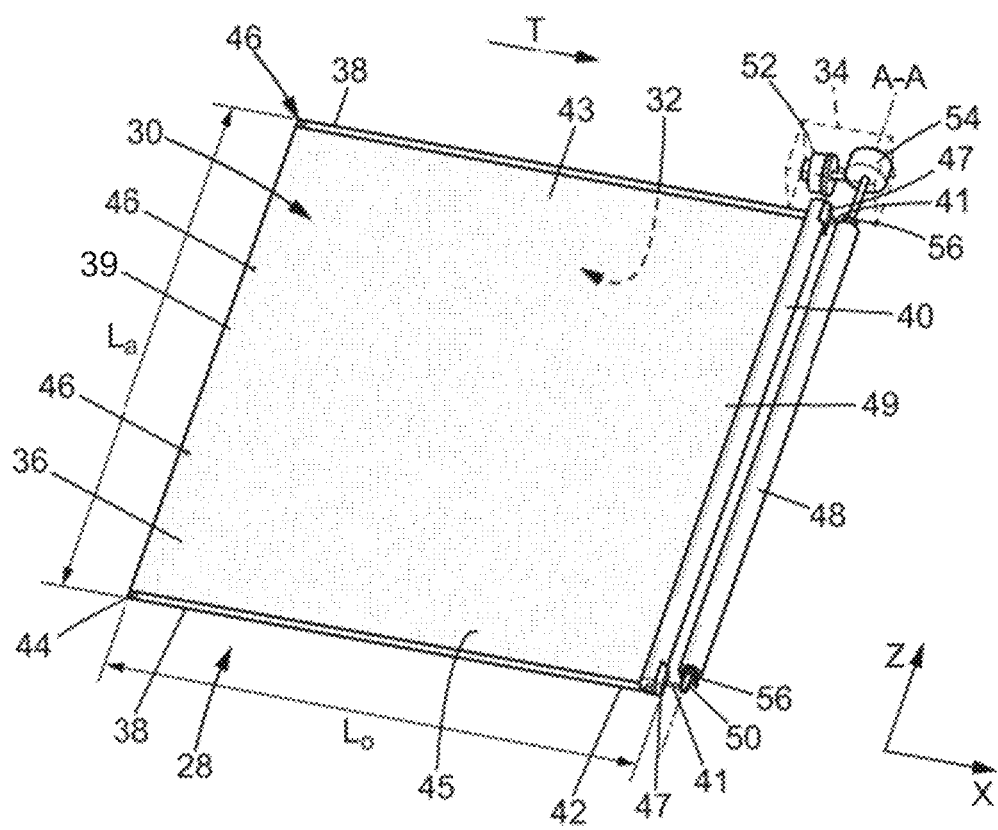
FIG. 2 is a perspective view of a thermal insulation device according to a first embodiment, said thermal insulation device being able to be supported by the spacecraft illustrated in FIG. 1.

Referring to FIGS. 1 and 2, the radiator 22 of the south face 18 supports a thermal insulation device 28 according to a first embodiment of the invention.

This thermal insulation device 28 comprises a first screen device 30 able to cover a first area 32 of the radiator and a traction device 34 able to control the first screen device 30.

The first screen device 30 comprises a thermally insulating sheet 36 fixed to the radiator 22 by fastening means 46, two springs 38 fixed to the insulating sheet, a support rod 40, and two cables 41 integrally secured to the springs.

The heat insulating sheet 36 is a flexible sheet. It is, for example, made of a Kapton sheet. It has a face able to reflect solar radiation, particularly infrared radiation. This reflecting face is, for example, implemented by depositing a thin layer of aluminum. An outer lateral edge 39 of the insulating sheet 36 is fixed to the radiator 22 so that its reflecting face is facing the space environment. In particular in the example illustrated in FIG. 1, the outer lateral edge 39 of the insulating sheet 36 is fixed to a longitudinal edge 26 of the external main face 24 of the radiator 22.

This attachment is implemented by fastening means 46 such as, for example, rivets. The insulating sheet 36 has, for example, a thickness of 50 μm. According to the embodiment represented, the insulating sheet 36 has a rectangular shape of length Lo and width La. The length Lo is measured in the pulling direction T.

Figure 3:
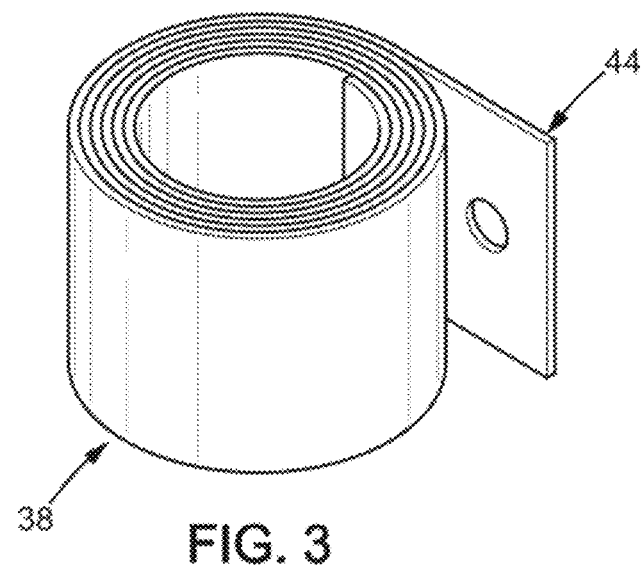
FIG. 3 is a perspective view of a spring of the thermal insulation device shown in FIG. 1.

Referring to FIG. 3, the springs 38 are springs exerting a constant force, meaning springs able to produce a constant reaction force regardless of their elongation. These are therefore non-linear springs. The springs are prestressed by their manufacture in order to remain rolled onto themselves at rest.

The springs are made of metal, for example of stainless steel.

The springs 38 each have the form of a ribbon made of a thin, flat strip. Each ribbon has a width between 5 and 30 millimeters, and preferably a width between 10 and 20 millimeters.

The springs 38 have a first end 42 located inside the rolled ribbon and a second end 44 located at the outer periphery of the rolled ribbon. The first end 42 of each spring is fixed to one end of the support rod 40. The second end 44 is fixed to the radiator by fastening means 46.

One spring 38 is attached along a longitudinal edge 43 of the insulating sheet 36. The other spring 38 is attached along an opposite longitudinal edge 45 of the insulating sheet. As shown in FIG. 2, the springs 38 are fixed to the insulating sheet along their entire length, meaning that a main face of the entire ribbon from the first end 42 to the second end 44 is fixed to the insulating sheet.

The support rod 40 is fixed to an inner lateral edge 49 of the insulating sheet which is opposite to the outer lateral edge 39 fixed to the radiator.

The cables 41 are each fixed to the support rod 40 or to the first end 42 of the springs 38, and to the traction device 34. These are flexible cables. They may be made of Kevlar or nylon for example.

The first screen device 30 also comprises at least two first stops 47 able to wedge the support rods 40 in place during launch of the spacecraft. The first stops 47 are fixed to the external main face of the radiator 22, between the insulating sheet 36 and the traction device 34.

The traction device 34 comprises a traction shaft 48 mounted so as to rotate about an axis of rotation A-A, bearings 50 supporting and guiding the traction shaft 48, a device 52 for locking the rotation of the traction shaft about said axis of rotation, and an actuator 54 able to rotate the traction shaft 48.

One end of each cable 41 is fixed to an end of the traction shaft 48. When the first screen device 30 is covering the first area 32 of the radiator, the cables 41 are wound on the traction shaft 48.

Pulleys 56 may advantageously be mounted on the traction shaft. When pulleys are mounted on the traction shaft, the cables 41 are fixed to and wound on the pulleys 56.

The bearings 50 are fixed to the external main face 24 of the radiators.

The locking device 52 maintains a defined level of prestress on the first screen device 30 so that it tolerates high mechanical loads during the launch of the spacecraft. This level of prestress is not felt by the actuator 54. The locking device 52 thus avoids fatiguing the motor of the actuator 54 by the mechanical loads from launch. Advantageously, this device allows not overdesigning the locking capacities of the motor.

The locking device 52 is what is generally called a hold-and-release mechanism or "HRM". It may, for example, consist of a shape-memory lock which, when it retracts due to heating, releases the actuator 54 from its locking position. Such a locking device is only used once, during launch of the spacecraft.

Alternatively, the springs are fixed at only a few points of the insulating sheet 36.

The actuator 54 is, for example, a stepper motor with a reduction gear. It is able to rotate the traction shaft 48 in one direction to deploy the insulating sheet 36 over the first area of the radiator and in the opposite direction to roll the insulating sheet around the support rod 40. In this embodiment, the actuator 54 controls the speed of the rolling and unrolling of the springs.

During launch of the spacecraft, the traction device 34 pulls in a pulling direction T on the first end 42 of the springs so that the insulating sheet 36 covers the first area 32. The pulling direction is perpendicular to the traction shaft 48 and is directed towards it. In the example illustrated in the figures, the pulling direction is directed along direction X of the orthonormal coordinate system (X, Y, Z). The interior of the body 4 is now thermally insulated by the first screen device 30. The thermal insulation device 28 is in an operating mode referred to as deployed mode.

In deployed mode, the locking device 52 is locked. The support rod 40 is abutting against the first stops 47. The cables 41 are wrapped around the traction shaft 48 or around the pulleys 56. The insulating sheet 36 and the springs 38 extend unrolled over the first area 32 of the radiator. The insulating sheet 36 and the springs 38 are tensioned between their second end 44 fixed to the edge 26 of the radiator and their first end 42 pulled by the cables 41. The springs 38 attempt to return to their curvature at rest, such that they apply a force F directed towards the external main face of the radiator. The insulating sheet 36 is thus pressed against the external main face of the radiator by the springs 38. Advantageously, in this position the insulating sheet 36 is not necessarily taut, such that it is not subject to the propagation of cracks generated by micrometeorite impacts.

Once the spacecraft is in orbit, the locking device 52 is unlocked. Then, the thermal insulation device 28 is placed in operating mode, referred to as exposure mode. For this purpose, the traction device 34 releases the first end 42 of the spring in order to expose the first area 32 to the space environment.

Figure 4:
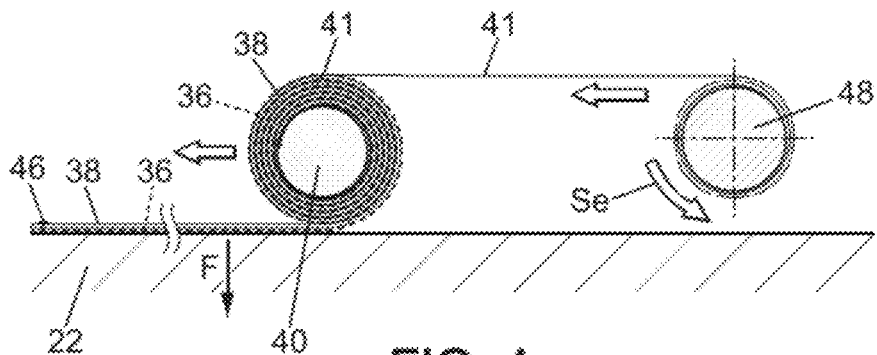
FIG. 4 is a section diagram of the thermal insulation device shown in FIG. 3, illustrating the operating principle of the thermal insulation device during exposure mode.

In particular, with reference to FIG. 4, in the thermal insulation device according to this first embodiment, the actuator 54 rotates the traction shaft 48 in a counterclockwise direction Se. The portion of cable 41 wound around the traction shaft 48 unwinds. The unwinding of the cables 41 causes the springs 38 to roll up. The springs 38 return to their at-rest coiled shape. By resuming their at-rest shape, the springs 38 roll up the insulating sheet 36 and the cables 41 along with them, around the support rod 40, as can be seen in FIG. 4. The cables 41 are interposed between the windings of the springs 38 and of the insulating sheet 36. The cables 41 remain at constant tautness because the natural force of the spring at constant force keeps them taut.

The first screen device 30 according to this first embodiment also makes it possible to cover the first area 32 once the spacecraft is in orbit, in order to insulate the interior of the body 4 according to specific needs. This puts the thermal insulation device 28 into an operating mode referred to as deployment mode.

Figure 5:
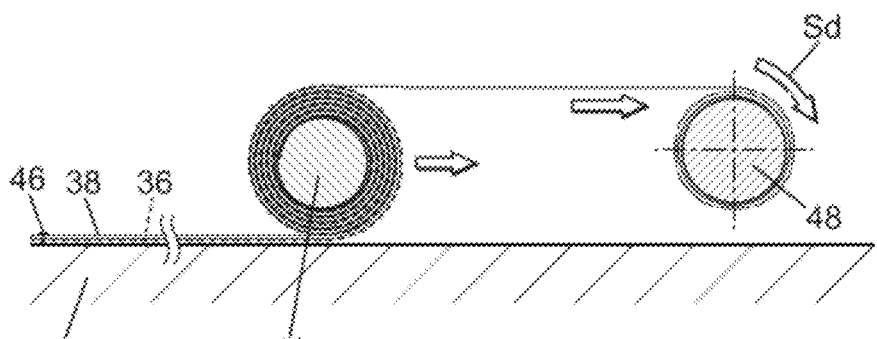
FIG. 5 is a section diagram of the thermal insulation device shown in FIG. 3, illustrating the operating principle of the thermal insulation device during deployment mode.

To this end, with reference to FIG. 5, the actuator 54 rotates the traction shaft 48 in a clockwise direction Sd. The cables 41 are wound around the traction shaft 48 or around the pulleys 56. The cable 41 pulls on the roll formed by the springs 38, the insulating sheet 36, and a portion of the cables 41. Due to the tension exerted by the cables 41, the springs 38 and insulating sheet 36 unroll and deploy once again over the first area 32 of the radiator.

In a variant, the actuator 54 may either control the rotational speed of the traction shaft 48 according to a single value fixed prior to launch, or may offer variable speeds (for example by remote control) according to mission requirements. Variability of the rotational speed can mean either between two uses of the thermal insulation devices (for example transition to exposure mode or to deployment mode), or during the same use in order to provide acceleration or deceleration (for example when approaching the extreme positions of the thermal insulation devices) to reduce the duration of the operation.

Figure 6:
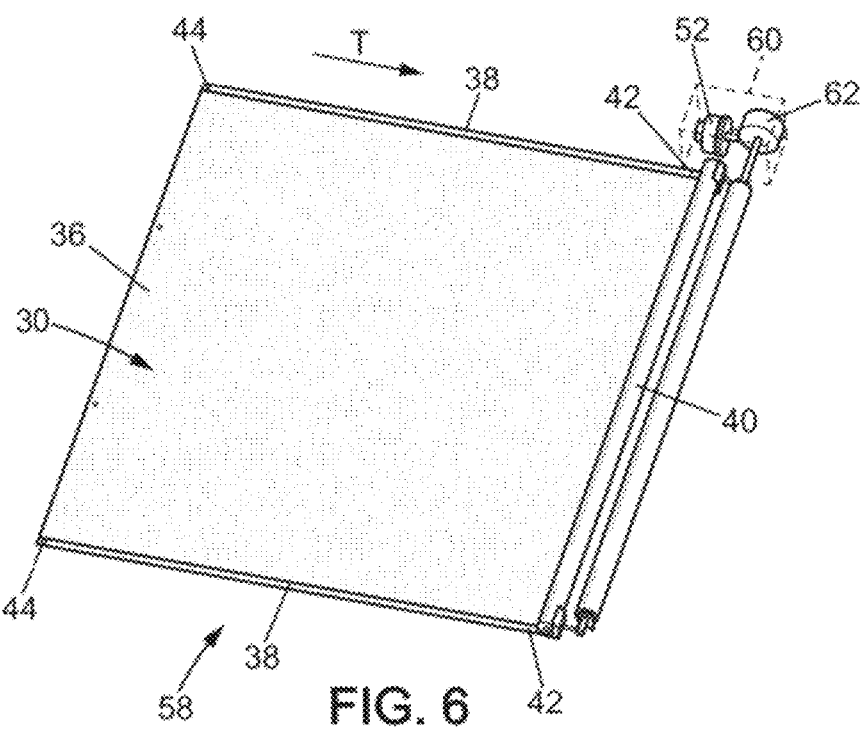
FIG. 6 is a perspective view of a thermal insulation device according to a second embodiment, said thermal insulation device being able to be supported by the spacecraft illustrated in FIG. 1.

Referring to FIG. 6, the thermal insulation device 58 according to a second embodiment of the invention is identical to the insulation device 38 according to the first embodiment except that the traction device 60 does not comprise an actuator 54 but comprises a damping device 62.

Unlike the thermal insulation device 38 according to the first embodiment, the thermal insulation device 58 according to the second embodiment cannot be placed in a mode of operation referred to as deployment mode. The thermal insulation device 58 according to the second embodiment is mounted on the spacecraft 2 in a deployed-mode configuration. Once in orbit, the thermal insulation device 58 is placed in exposure mode. The thermal insulation device 58 is then kept in this position.

The damping device 62 controls the speed at which the insulating sheet 36 is rolled onto the support rod 40 during exposure mode. The damping device 62 consists, for example, of a centrifugal brake or an eddy current brake.

In operation, during exposure mode the locking device 52 releases the first end 42 of the springs. As the springs 38 attempt to return to their at-rest coiled shape, they exert a constant force on the cables 4 in a direction opposite to the pulling direction T. The traction shaft 48 is rotated by the force exerted by the springs 38. The damping device 62 limits the rotational speed of the traction shaft 48 and thus regulates the speed at which the insulating sheet 36 and springs 38 roll up during exposure mode.

Advantageously, the actuator 54 and the damping device 62 may be redundant. The thermal insulation device according to the invention is therefore robust.

According to a variant not shown, the traction device 60 consists of only a pulley and a damping device.

According to another variant not shown, the traction device 34 comprises two flexible cables and two rotating actuators each able to control the winding of a cable.

As a variant, the thermal insulation device according to the invention comprises an emergency cable severing device, not shown. In case of failure, for example in case one of the elements of the device jams in a deployed position (i.e. covering the radiators), this emergency device 41 severs the cables. The springs, which are preformed to coil back onto themselves, ensure that the outer surfaces of the radiators are exposed.

Compared to solutions in which the screen device rolls/unrolls directly on the traction shaft, the device according to the invention is more reliable for a satellite mission. In the invention, only the cables 41 are wound onto the traction shaft. Thus, if the traction device were to break down, it would be possible to use the emergency cable severing device so that the screen devices automatically roll onto themselves with no possibility of jamming, thus uncovering the radiators. To compensate for this loss of function, it would be sufficient to heat the interior of the satellite by means of heaters when needed. This situation would be far less damaging than cases where thermal screen devices rolled onto the traction shaft break down in the "deployment mode" position, completely covering the radiators. In such a situation, after use of the payload, the temperature inside the satellite could increase significantly and the radiators would be prevented from carrying out their heat dissipation function, which can cause irreparable damage to some electronic equipment.

Figure 7:
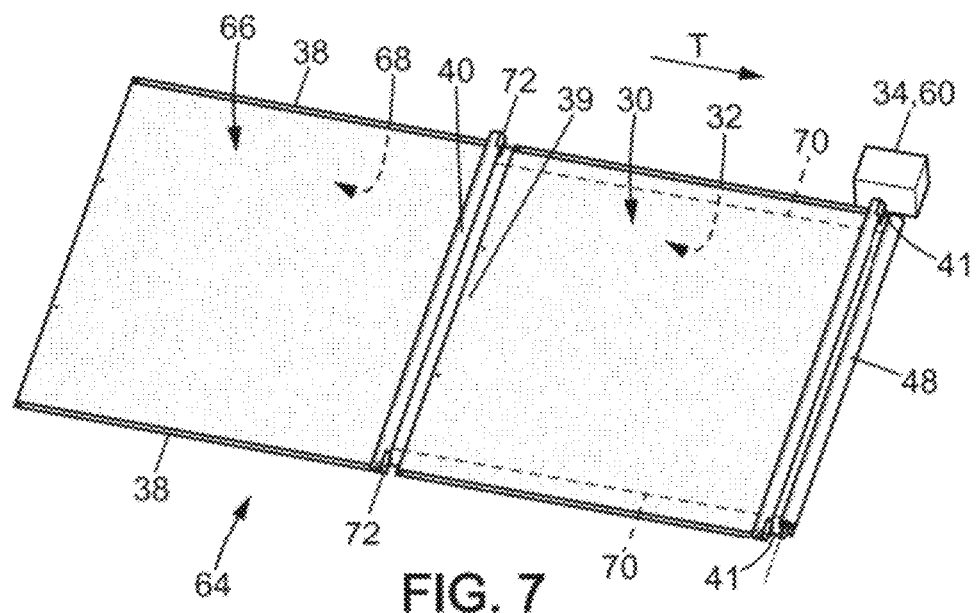
FIG. 7 is a perspective view of a thermal insulation device according to a third embodiment, said thermal insulation device being able to be supported by the spacecraft illustrated in FIG. 1.

Referring to FIG. 7, the thermal insulation device 64 according to a third embodiment of the invention is identical to the thermal insulation device 28 according to the first embodiment except that it comprises a second screen device 66 able to cover a second area 68 of the radiator, located in the extension of the first area 32 along the pulling direction T.

The first 30 and second 66 screen devices are controlled by a common traction device 34, 60. The traction device 34, 60 may comprise an actuator 54 or a damping device 62.

The first 30 and second 66 screen devices are on the same side of the traction shaft 48. In particular, the second screen device 66 is adjacent to and in line with the first screen device 30 along the pulling direction T.

The second screen device 66 is identical to the first screen device 30 except that the cables 70 of the second screen device are longer than the cables 41 of the first screen device. The cables 70 of the second screen device are also fixed to the traction shaft 48 or to pulleys 56 integrally secured to the traction shaft. The cables 70 of the second screen device are wound onto the traction shaft 48 at a predetermined distance from the cables 41 wound onto the first screen device.

The support rod 40 of the second screen device extends parallel to the support rod 40 of the first screen device 30. In particular, the support rod 40 of the second screen device is adjacent and parallel to the outer lateral edge 39 of the insulating sheet 36 of the first screen device.

The second screen device 66 comprises second stops 72 for wedging in place the support rod 40 of the second screen device. These second stops 72 are fixed on the external main face 24 of the radiator, next to and several centimeters from the outer lateral edge 39 of the insulating sheet 36 of the first screen device 30.

The springs 38 of the second screen device 66 extend parallel to the pulling direction T. In exposure mode, the springs 38 of the first screen device 30 and the springs 38 of the second screen device 66 are rolled onto themselves in a same rolling direction.

The first 30 and second 66 screen devices of the thermal insulation device according to the third embodiment operate in the same manner as the thermal insulation devices according to the first and second embodiment, the insulating sheets 36 of the two screen devices being controlled simultaneously by the rotation of the traction shaft 48.

Figure 8:
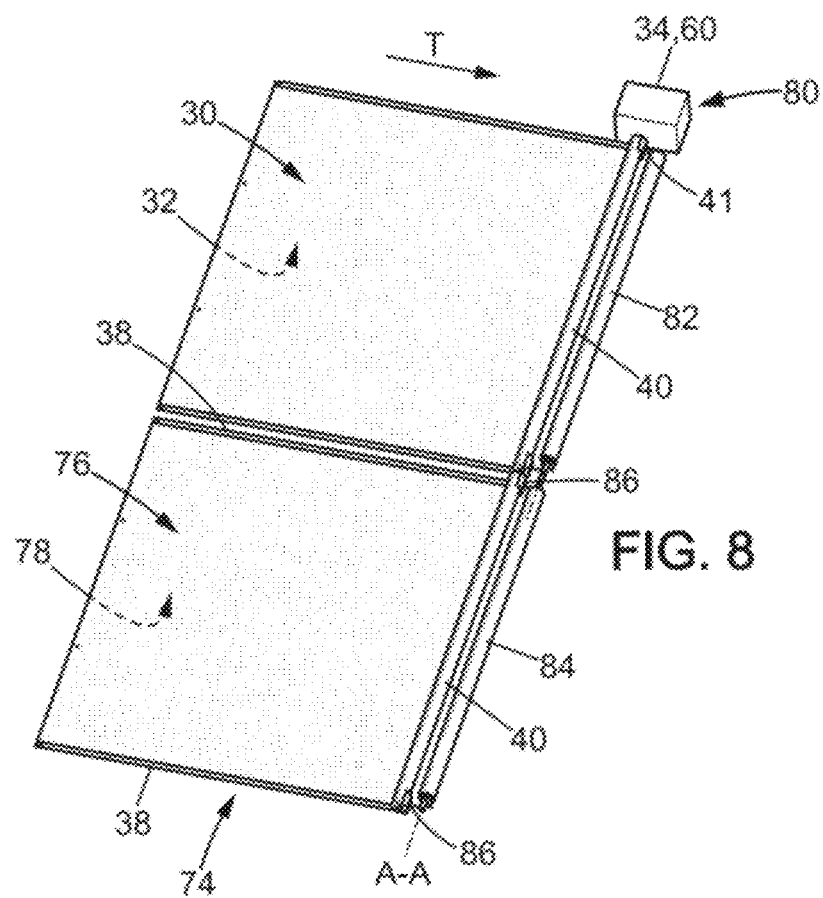
FIG. 8 is a perspective view of a thermal insulation device according to a fourth embodiment, said thermal insulation device being able to be supported by the spacecraft illustrated in FIG. 1.

Referring to FIG. 8, the thermal insulation device 74 according to a fourth embodiment of the invention is identical to the insulation device 28 according to the first embodiment except that it comprises a second screen device 76 able to cover a second area 78 of the radiator located in the extension of the first area 32 along a direction perpendicular to the pulling direction T.

The first 30 and second 76 screen devices are controlled by the same traction device 80. The traction device 80 may comprise an actuator 54 or a damping device 62. The traction device 80 comprises a first traction shaft 82 and a second traction shaft 84 which are mounted on the same axis of rotation A-A. The first 30 and second 76 screen devices are on the same side of the first and second traction shafts 82, 84.

The second screen device 76 is adjacent to and in line with the first screen device 30 in a direction perpendicular to the pulling direction T.

According to a variant not shown, the first traction shaft 82 and the second traction shaft 84 are interconnected by means of a gearbox type of device. Thus, for a given rotational speed of the first traction shaft 82, different rotational speed ratios are possible for the second traction shaft 84. This ratio may be fixed prior to launch or may be varied by remote control according to requirements.

According to a variant not shown, the traction device comprises a single traction shaft having a length greater than the width La of the insulating sheet of the first screen device 30 plus the width La of the insulating sheet of the second screen device 66.

The cables 41 of the second screen device 76 are fixed to the second traction shaft 84 or to pulleys integrally secured to the second traction shaft 84.

The support rod 40 of the second screen device extends in line with the support rod 40 of the first screen device 30.

The second screen device 76 comprises second stops 86 for wedging in place the support rod 40 of the second screen device. These second stops 86 are fixed on the external main face 24 of the radiator next to and at a short distance from each end of the second traction shaft 84.

The springs 38 of the second screen device 66 extend parallel to the pulling direction T. In exposure mode, the springs 38 of the first screen device 30 and the springs 38 of the second screen device 66 are rolled onto themselves in the same rolling direction.

The first 30 and second 76 screen devices of the thermal insulation device according to the third embodiment operate in the same manner as the thermal insulation devices according to the first and second embodiments. The insulating sheets 36 of the two screen devices are simultaneously controlled by the rotation of the first 82 and second 84 traction shafts.

Figure 9:
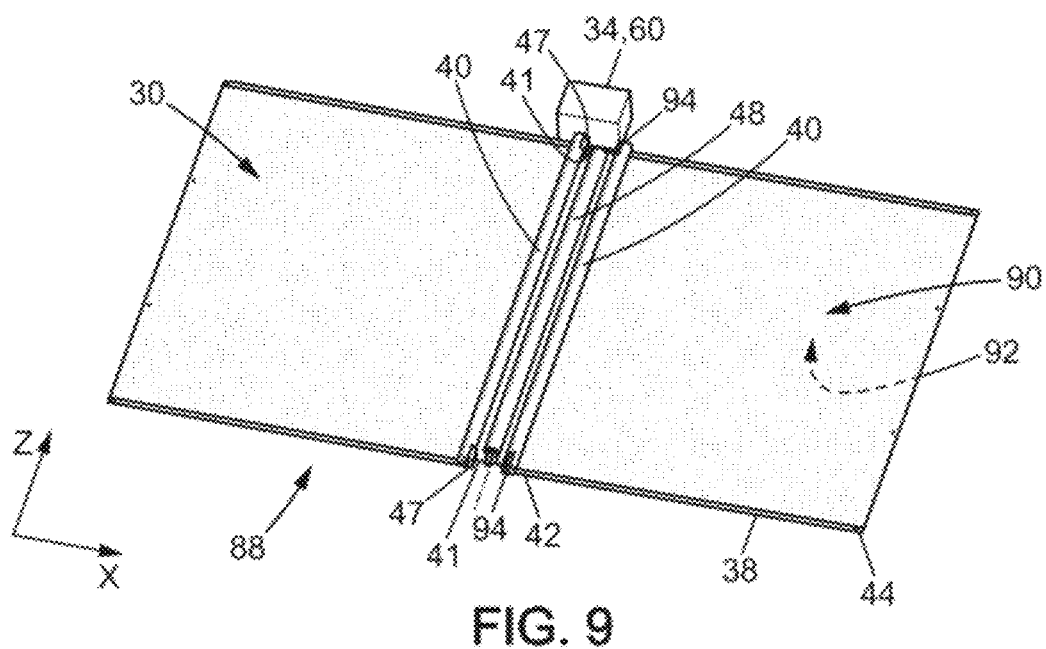
FIG. 9 is a perspective view of a thermal insulation device according to a fifth embodiment, said thermal insulation device being able to be supported by the spacecraft illustrated in FIG. 1.

Referring to FIG. 9, the thermal insulation device 88 according to a fifth embodiment of the invention is identical to the insulation device 28 according to the first embodiment, except that it comprises a second screen device 90 able to cover a second area 92 adjacent to the first area 32.

The first 30 and second 90 screen devices are driven by the same traction device 34, 60. Thus, the insulating sheets of the first 30 and second 90 screen devices are rolled onto the support rods 40 simultaneously and by the same traction device 34, 60. This traction device may comprise an actuator 54 or a damping device 62.

In this fifth embodiment, the second screen device 90 is arranged on the other side of the traction device 34, 60. The traction shaft 48 is thus arranged between the first screen device 30 and the second screen device 90.

The second screen device 90 comprises second stops 94 fixed to the radiator on the other side of the traction shaft 48, in line with the first stops 47 of the first screen device.

The support rod 40 of the second screen device 90 extends parallel to the support rod 40 of the first screen device 30.

The first end 42 of the springs of the second screen device is fixed to the support rod 40. The second end 44 of the springs of the second screen device is fixed to the radiator by fastening means 46. However, the springs 38 of the second screen device are mounted on the insulating sheet in the opposite direction to the springs 38 of the first screen device. And the cables 41 of the second screen device 90 are wound on the traction shaft 48 in a rolling direction that is opposite to the rolling direction of the cables 41 of the first screen device 30. As a result, the traction device 34, 60 applies tensile force to the springs 38 of the second screen device in a direction opposite to the pulling direction T.

At rest, the springs 38 of the first screen device are rolled onto the support rod 40 in a first rolling direction S1. The springs 58 of the second screen device are rolled onto the support rod 40 in a second rolling direction S2. The second rolling direction S2 is opposite to the first rolling direction S1.

In the example shown in FIG. 10, during exposure mode the traction shaft 48 is rotated in a counterclockwise direction. The springs 58 of the first screen device are rolled onto the support rod in a counterclockwise direction. The springs 58 of the second screen device are rolled onto the support rod 40 in a clockwise direction.

The insulating sheet of the first screen device 30 rolls up by moving in a direction opposite to direction X. The insulating sheet of the second screen device 90 rolls up by moving in the direction of direction X.

Referring to FIG. 11, during deployment mode the traction shaft 48 is rotated in a clockwise direction. The springs 58 of the first screen device unroll in a clockwise direction. The springs 58 of the second screen device unroll in a counterclockwise direction. The insulating sheet of the first screen device 30 unrolls by moving in the direction of direction X. The insulating sheet of the second screen device 90 unrolls by moving in the direction opposite to direction X.

According to the third, fourth, and fifth embodiments shown in FIGS. 7-9, the insulating sheet 36 of the second screen device 66, 76 has the same length Lo and the same width La as the insulating sheet 36 of the first screen device 30. Alternatively, the length Lo and/or width La of the insulating sheet 36 of the second screen device 66,76 may be different from the length Lo and/or width La of the insulating sheet 36 of the first screen device 30.

According to a variant (not shown) of the third, fourth, and fifth embodiments, the insulating sheet 36 of the first screen device 30 has a length Lo greater than the length Lo of the insulating sheet 36 of the second screen device 90. To enable exposure and deployment by the same traction shaft, said shaft carries at least two pulleys of a diameter greater than the diameter of the traction shaft, said cables of the second screen device being wound onto these pulleys.

According to another variant (not shown) of the third, fourth, and fifth embodiments, the insulating sheet of the first screen device 30 has a width La that is greater than the width La of the second screen device.

Figure 12:
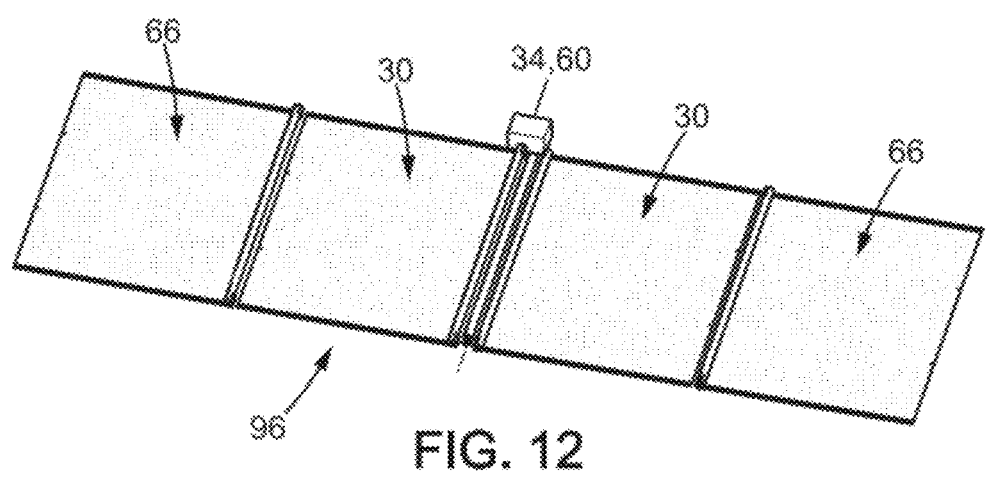
FIG. 12 is a perspective view of a thermal insulation device according to a sixth embodiment, said thermal insulation device being able to be supported by a radiator of the spacecraft shown in FIG. 1.

According to a sixth embodiment of the invention shown in FIG. 12, the thermal insulation device 96 has two screen devices located on one side of the traction shaft 48 and two screen devices located on the other side of the traction shaft. The insulating sheets of these four screen devices are moved by the same traction device 34, 60. The traction device may comprise an actuator 54 or a damping device 62.

Figure 13:
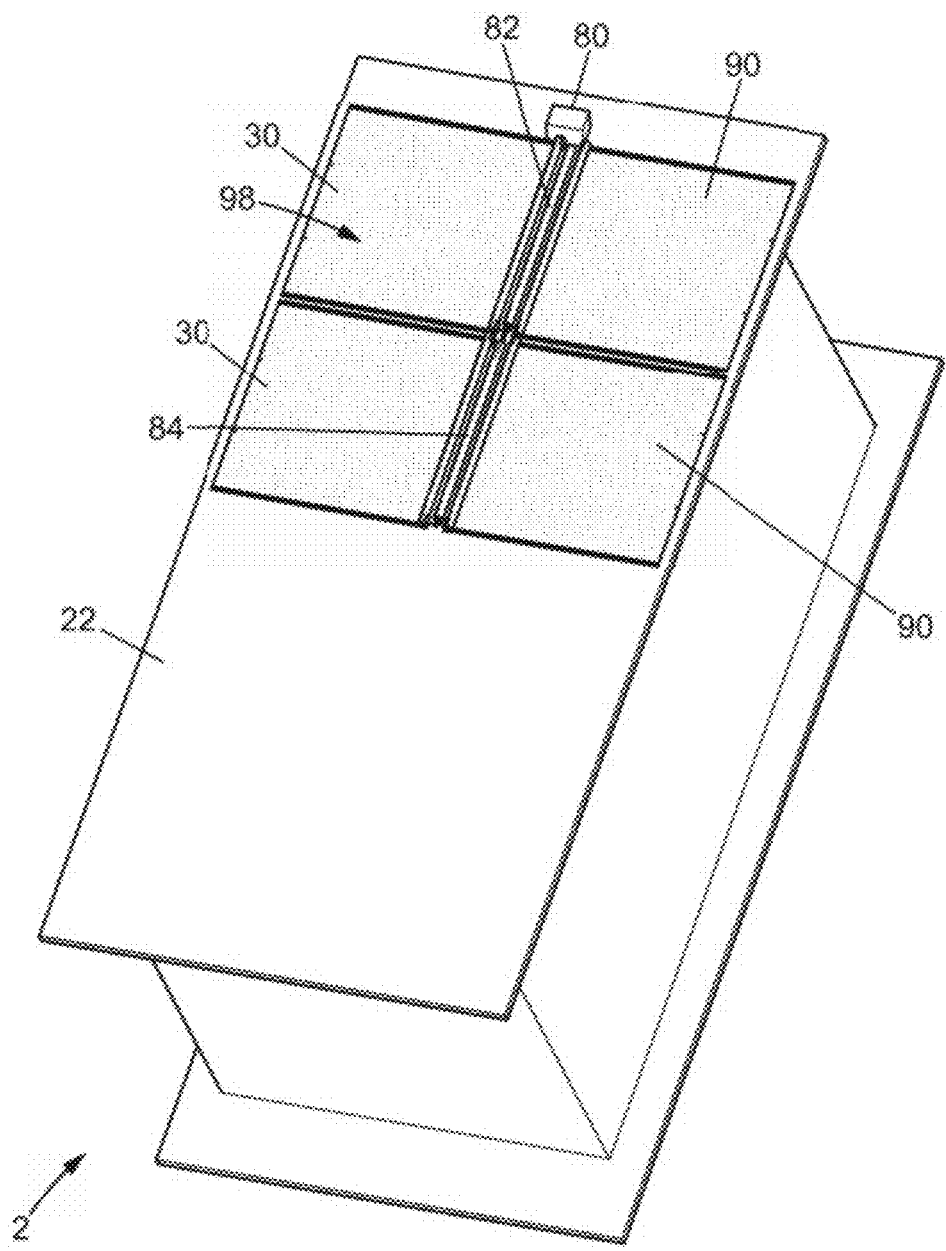
FIG. 13 is a perspective view of a thermal insulation device according to a seventh embodiment, said thermal insulation device being supported by a radiator of the spacecraft shown in FIG. 1.
Figure 14:
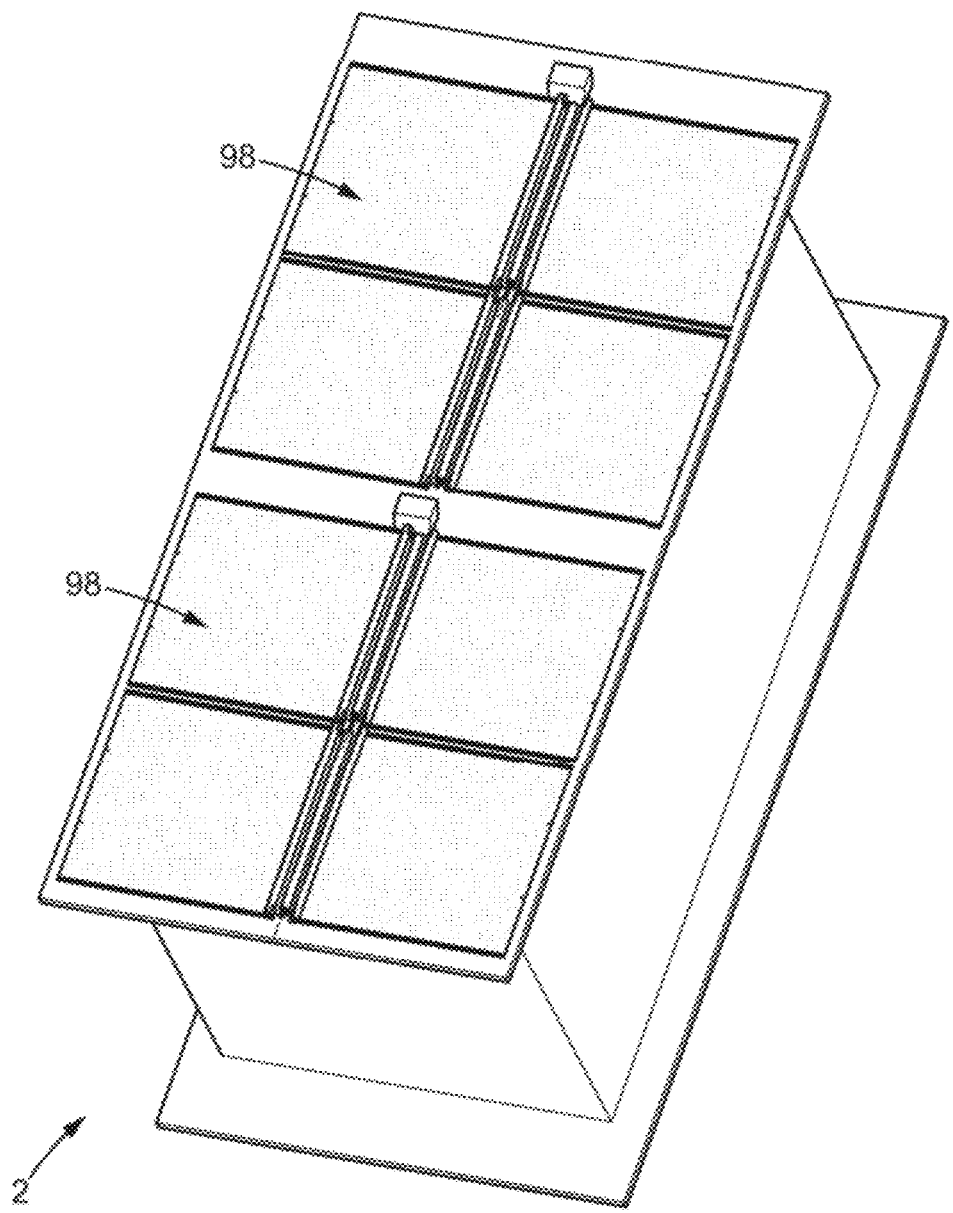
FIG. 14 is a perspective view of two thermal insulation devices according to the seventh embodiment, said thermal insulation device being supported by a radiator of the spacecraft shown in FIG. 1.

According to a seventh embodiment of the invention shown in FIGS. 13 and 14, the thermal insulation device 98 comprises four screen devices and a traction device 80 able to move the four screen devices at the same time.

The traction device 80 has a first traction shaft 82 and a second traction shaft 84. The second traction shaft 84 is mounted on the same axis A-A as the first traction shaft 82. First 30 and second 90 screen devices are arranged one on each side of the first traction shaft 82. First 30 and second 90 screen devices are arranged one on each side of the second traction shaft 84.

FIG. 14 shows an example of using two thermal insulation devices 98 according to the seventh embodiment of the invention, on a same radiator of a spacecraft.

Figure 15:
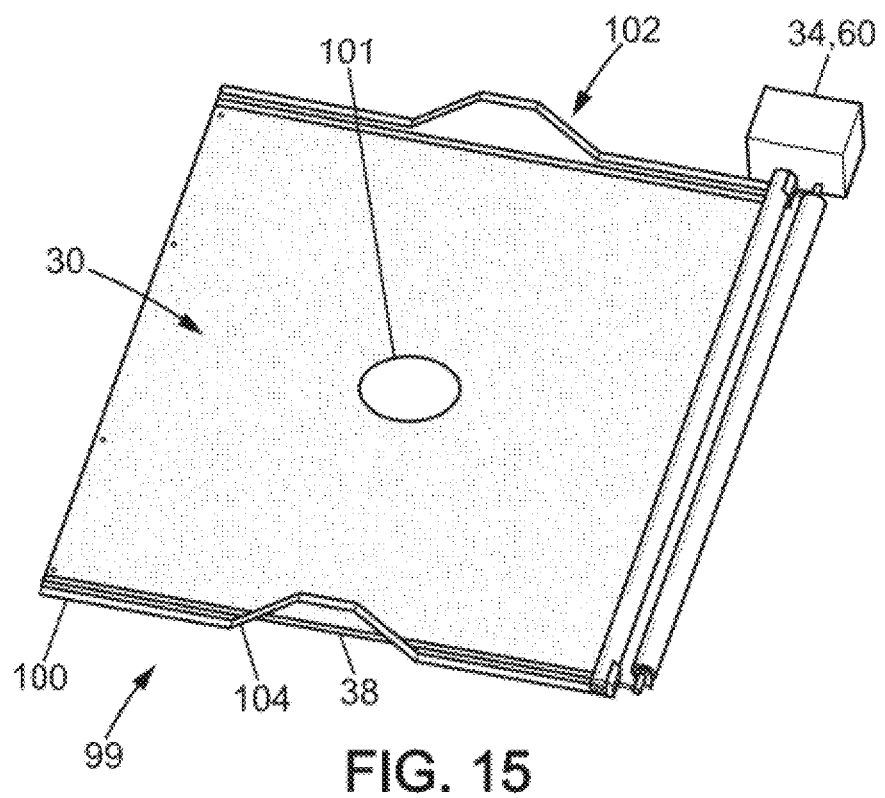
FIG. 15 is a perspective view of a thermal insulation device according to the eighth embodiment, said thermal insulation device being able to be supported by a radiator of the spacecraft shown in FIG. 1.

Referring to FIG. 15, the thermal insulation device 99 according to an eighth embodiment of the invention is identical to the insulation device 28 according to the first embodiment except that
the insulating sheet 36 further comprises an opening 101,
the support rods 40 have a length greater than the width La of the insulating sheet, and
it further comprises two ramps 100, 102 fixed to the external main face of the radiator.

The ramps 100, 102 extend along the pulling direction T, one on each side of the longitudinal edges 43, 45 of the insulating sheet.

The ramps 100, 102 have ramp portions 104 which protrude from the radiator. In particular, the ramp portions 104 extend in a plane perpendicular to the external main face of the radiator 22, 23. The ends of the support rods are able to bear against said ramps 100, 102 during exposure mode or during deployment mode. Thus, advantageously, the ramps 100, 102 allow the support rod to pass above a barrier to the positioning or rolling of the insulating sheet.

When the screen device is in a deployed mode and the insulating sheet is covering the area of the radiator to be insulated, the springs and the insulating sheet are pressed against the radiator. The opening 101 is traversed by a device which protrudes relative to the radiator, for example such as a transmitter.

Alternatively, the springs bear against the ramps.

Figure 16:
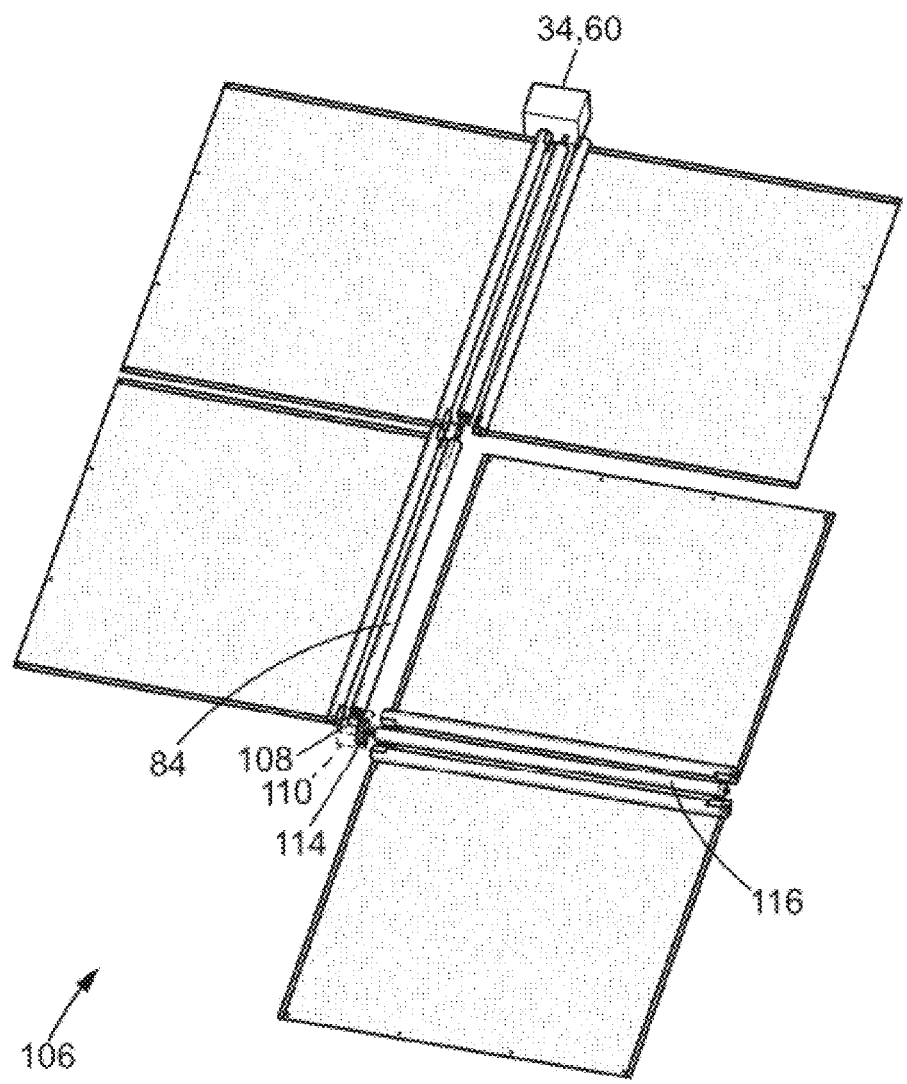
FIG. 16 is a perspective view of a thermal insulation device according to the ninth embodiment, said thermal insulation device being able to be supported by a radiator of the spacecraft shown in FIG. 1.

Referring to FIG. 16, the thermal insulation device 106 according to a ninth embodiment of the invention is identical to the thermal insulation device according to the seventh embodiment except for the fact that one of the screen devices attached to the second traction shaft 84 is replaced by a first gear mechanism 108 fixed to the free end of the second traction shaft 84, a bevel gear device 110 coupled to the first gear mechanism 108, a third traction shaft 116 having a second gear mechanism 114 coupled to the bevel gear device 110, and two additional screen devices fixed by cables to the third traction shaft 116. The additional traction shaft 116 extends along the pulling direction T.

Figure 17:
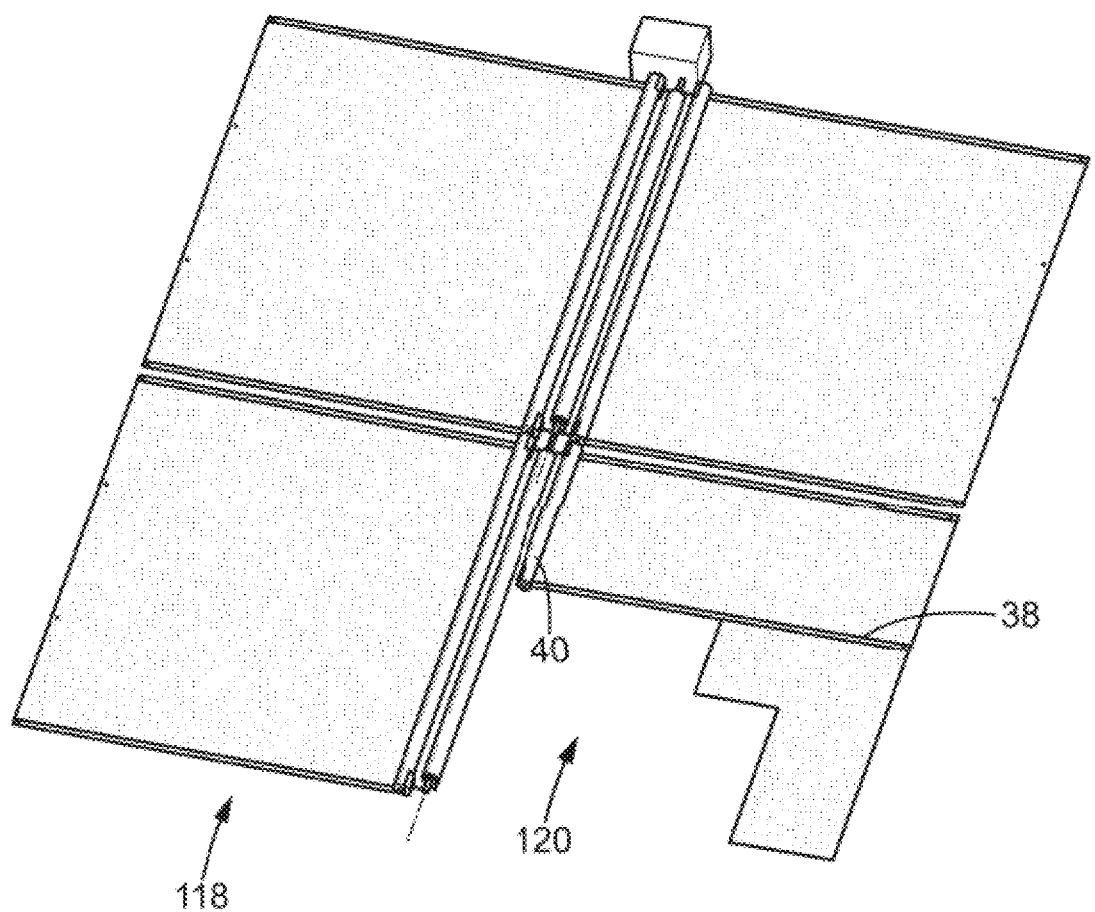
FIG. 17 is a perspective view of a thermal insulation device according to the tenth embodiment, said thermal insulation device being able to be supported by a radiator of the spacecraft shown in FIG. 1.

Referring to FIG. 17, the thermal insulation device 118 according to a tenth embodiment of the invention is identical to the thermal insulation device according to the seventh embodiment except that one of the insulating sheets 36 has one or more cut-outs 120. In this embodiment, the support rod is shorter and the spring extends in part over the longitudinal edge of the insulating sheet and in part into the interior of the insulating sheet. This embodiment allows deliberately not covering a portion of the radiator or avoiding equipment that mY be fixed to the radiator 22. Such equipment includes for example a transmitter or an arm of a solar panel.

Figure 18:
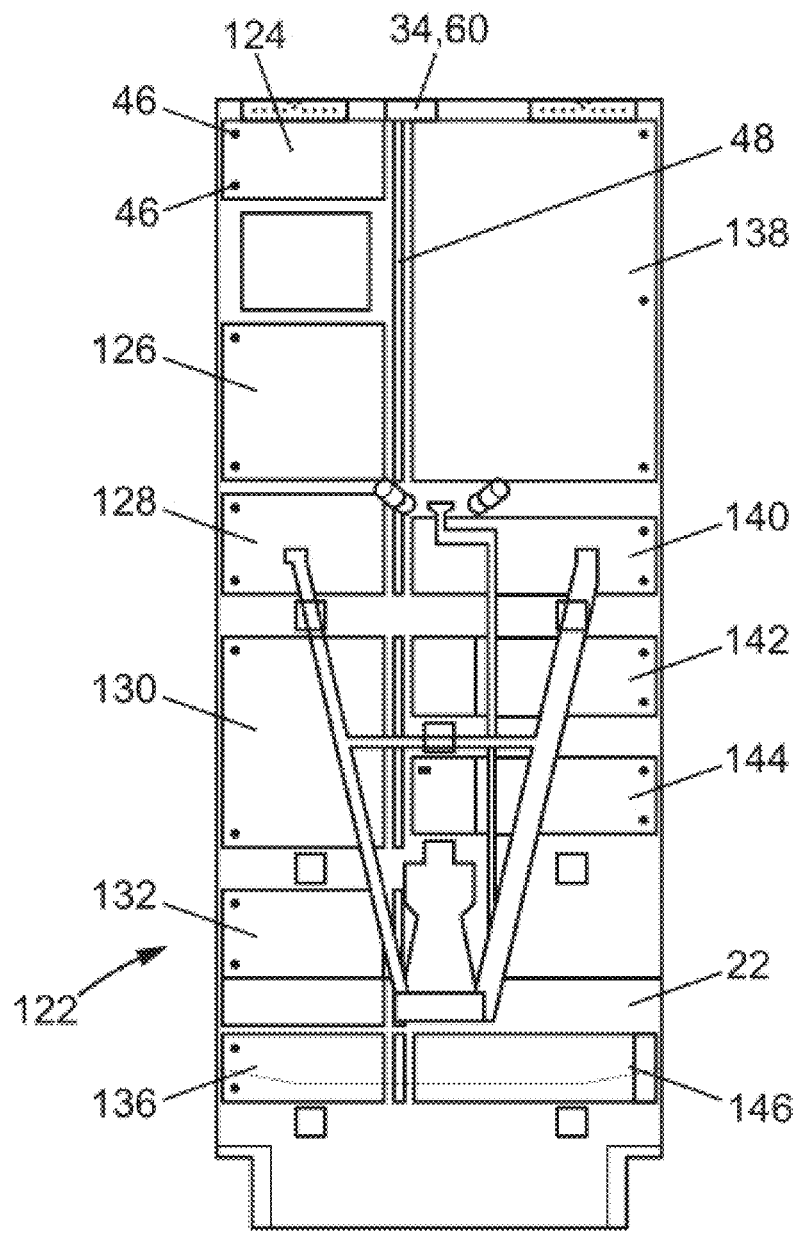
FIG. 18 is a front view of an eleventh embodiment of a thermal insulation device arranged on a radiator of the spacecraft shown in FIG. 1.

FIG. 18 shows an example of using a thermal insulation device 122 fixed to a radiator 22 of a spacecraft. This thermal insulation device 122 has a single traction shaft 48, six screen devices 124, 126, 128, 130, 132, 136 arranged to the right of the single traction shaft 48, and five screen devices 138, 140, 142, 144, 146 arranged to the left of the traction shaft.

Alternatively, it is also possible to use traction shafts 48 having a diameter that does not remain uniform along their entire length. In the case of an embodiment using multiple screen devices, this allows very simply and effectively obtaining different unwinding speeds of the cables (and therefore of the different screen devices), for the same rotational speed of the traction shaft 48.

The operation of the thermal insulation devices described herein can be controlled in several ways: either by sending remote commands from the ground, or automatically on board by means of a control system internal to the satellite.

Such control (from the ground or on board) has the purpose of determining at what moment the following operations take place:
the unlocking of the unlocking device 52
the transition to a deployment mode or to an exposure mode, for how long, with what range of motion (partial or full deployment), and for which screen device.

The advantage of the thermal insulation device of the invention is its simplicity and generic approach, which allow many economies in the qualification and in the assembly times, and which reduce the risks in satellite programs using such devices. Indeed, the invention uses a base module which can be qualified once and for all. Each new satellite program can then combine one or more of these devices like puzzle pieces, according to the outer configuration of the satellite walls, while benefiting from the prior qualification of the base module.

The invention could also be used as a thermal insulation device on the X faces of satellites, and also as a thermal shading system for optical instruments such as telescopes.

The device of the invention is applicable to communication or observation satellites in any type of orbit (LEO, MEO, HEO, GEO), as well as to scientific space missions (probes) with long transfer times.

The invention claimed is:

1. A spacecraft comprising a body having at least one face, at least one radiator carried by said face and at least one thermal insulation device carried by the radiator, said thermal insulation device comprising:
   a first screen device able to cover a first area of said radiator, said first screen device comprising a thermally insulating and flexible sheet and
   a traction device able to pull in a pulling direction so that the insulating sheet covers the first area in a mode referred to as deployed mode,
   wherein said thermal insulation device comprises further at least two springs able to generate a constant reaction force, said springs being preformed so as to roll onto themselves at rest, said springs being fixed to the insulating sheet, said springs each having a first end fixed to the traction device and a second end (44) fixed to the radiator; and
   wherein the traction device is configured to pull in said pulling direction on the first end of said springs of the first screen device so that the insulating sheet covers said first area in said deployed mode, said traction device being able to release the first end of said springs so that the insulating sheet exposes the first area to the space environment in a mode referred to as exposure mode.

2. The spacecraft according to claim 1, wherein the first screen device comprises at least two cables, each cable being integrally secured to said traction device and to the first end of the springs, said cables being interposed between two windings of the springs in exposure mode.

3. The spacecraft according to claim 2,
   wherein the traction device comprises:
   a traction shaft mounted so as to rotate about an axis of rotation, said traction shaft extending perpendicularly to the pulling direction, the first end of said springs being integrally secured to said traction shaft; and
   a device for locking the rotation of the traction shaft about said axis of rotation; wherein the traction device is arranged between the first screen device and the second screen device and wherein, in exposure mode, the springs of the first screen device are rolled onto themselves in a first rolling direction and the springs (38) of the second screen device are rolled onto themselves in a second rolling direction, the second rolling direction being opposite to the first rolling direction; and
   wherein the insulating sheet of the first screen device has a length greater than the length of the insulating sheet of the second screen device, said length being measured in the pulling direction, and wherein the traction shaft supports at least two pulleys having a diameter greater than the diameter of the traction shaft, said cables of the second screen device being wound on said pulleys.

4. The spacecraft according to claim 1, wherein the first screen device further comprises a support rod extending in a direction perpendicular to the pulling direction and at least two first stops fixed to the radiator between the insulating sheet and the traction device, said first stops being able to wedge the support rod in place during launch of the spacecraft.

5. The spacecraft according to claim 1, wherein the traction device comprises:
   a traction shaft mounted so as to rotate about an axis of rotation, said traction shaft extending perpendicularly to the pulling direction, the first end of said springs being integrally secured to said traction shaft; and
   a device for locking the rotation of the traction shaft about said axis of rotation.

6. The spacecraft according to claim 5, wherein the traction device comprises an actuator able to rotate the traction shaft.

7. The spacecraft according to claim 5, wherein the traction device further comprises a damping device able to damp the rotation of the traction shaft when the locking device is unlocked.

8. The spacecraft according to claim 5, which comprises a first gear mechanism fixed to a free end of the traction shaft, a bevel gear device coupled to the first gear mechanism, an additional traction shaft having a second gear mechanism coupled to the bevel gear device, and at least one additional screen device fixed by cables to the additional traction shaft; the additional traction shaft extending along the pulling direction.

9. The spacecraft according to claim 1, wherein the thermal insulation device further comprises a second screen device able to cover a second area, said second screen device being identical to the first screen device, the springs of said second screen device extending parallel to the pulling direction.

10. The spacecraft according to claim 9, wherein the first screen device and the second screen device are arranged on the same side of the traction device, and wherein, in exposure mode, the springs (38) of the first screen device and the springs of the second screen device are rolled onto themselves in a same rolling direction.

11. The spacecraft according to claim 10, wherein the insulating sheet of the second screen device is arranged in the extension of the insulating sheet of the first screen device, along the pulling direction.

12. The spacecraft according to claim 10, wherein the insulating sheet of the second screen device is arranged in the extension of the insulating sheet of the first screen device, along a direction perpendicular to the pulling direction.

13. The spacecraft according to claim 9, wherein the traction device is arranged between the first screen device and the second screen device and wherein, in exposure mode, the springs of the first screen device are rolled onto themselves in a first rolling direction and the springs (38) of the second screen device are rolled onto themselves in a second rolling direction, the second rolling direction being opposite to the first rolling direction.

14. The spacecraft according to claim 13, wherein the insulating sheet of the first screen device has a width greater than the width of the second screen device, said width being measured in a direction perpendicular to the pulling direction.

15. The spacecraft according to claim 13, wherein the first screen device comprises at least two ramps fixed to the radiator in a direction parallel to the pulling direction, the first screen device further comprising two support rods extending in a direction perpendicular to the pulling direction, at least one among the springs and the ends of the support rods being able to bear against said ramps in deployed mode, said ramps having ramp portions which protrude relative to the radiator.

16. The spacecraft according to claim 1, wherein at least one edge of the insulating sheet has at least one cutout.

17. The spacecraft according to claim 1, wherein said springs are flat strips of stainless steel in the form of a ribbon, said strips having a width between 5 and 30 millimeters.

18. The spacecraft according to claim 1, wherein the insulating sheet is a sheet of polyimide covered with an aluminum layer.

* * * * *